Patented May 15, 1928.

1,670,059

UNITED STATES PATENT OFFICE.

ERNST BURCKHARDT AND MAX STÄRKLE, OF BASEL, SWITZERLAND, ASSIGNORS TO THE FIRM: CHEMICAL WORKS FORMERLY SANDOZ, OF BASEL, SWITZERLAND.

PROCESS FOR THE PREPARATION OF EMETINE.

No Drawing. Application filed June 8, 1927, Serial No. 197,507, and in Switzerland May 27, 1927.

Cephaeline is rarely used in medicine, whereas its methylether: emetine is a most valuable and frequently used alkaloid. The transformation of cephaeline into emetine could, up to now, only be carried out with nascent diazo methane. Other methylation agents, as for instance the frequently employed dimethylsulphate, give insufficient yields, because they do not only methylate the phenolic hydroxy group of cephaeline, but also its secondary nitrogen atom.

It has now been found that it is possible to easily transform cephaeline into emetine if the methylation is carried out with phenyltrimethylammoniumhydroxide, or with mixtures of substances forming this quarternary base, whereby only traces of n-methylated by-products are formed.

Phenyltrimethylammoniumhydroxide has already been used for the methylation of phenolic hydroxy groups of alkaloids as stated in Rodinow, Bulletin de la Société Chimique de France 39, 305–325 (1926), according to which this compound does not alter the group $>$N—R, contrarily to other methylation agents.

In spite of this statement it could not have been foreseen, that phenyltrimethylammoniumhydroxide leaves the imino-group of cephaeline practically unaltered and gives good yields of emetine, since this agent has hitherto only been used for the methylation of substances containing a tertiary nitrogen atom.

The new process possesses in the first place the advantage over the process using diazo methane, that cheaper raw materials are employed. Further, the working with phenyltrimethylammoniumhydroxide or its salts is harmless as against the employment of the toxic nitrosomethyluretane or diazo methane, which is important for the industrial working of the process.

The following example illustrates the new process: 68 g. of phenyltrimethylammonium-p-toluenesulphonate are dissolved in 250 ccm. of warm absolute alcohol. After cooling, a solution of 5.1 g. of sodium in 150 ccm. of absolute alcohol is added and the mixture allowed to stay for some time. The separated sodiumtoluenesulphonate is then filtered off and thoroughly washed with absolute alcohol. 94 g. of cephaeline are then dissolved in the filtrate and the alcohol is completely removed as quickly as possible by evaporating, advantageously under stirring and by finally raising the temperature to 130°–140° C. As soon as no alcohol distils any more, the mass is cooled to 80° C. and acidulated with a mixture of 30 ccm. of glacial acetic acid and 200 ccm. of water. The acid solution is then repeatedly shaken out with petroleum spirit in order to remove all dimethylaniline and afterwards strongly alkalized with caustic soda. The liberated base is then completely extracted with ether. In order to remove the unaltered cephaeline the etheral solution is thoroughly shaken with a caustic soda solution and water and afterwards dried. The ether is then evaporated, the base dissolved in methylalcohol and transformed as usual into its hydrobromide. The salt thus obtained is purified by recrystallization from water.

The methylation can also be carried out by starting from other salts of phenyltrimethylammoniumhydroxide, for instance from its hydrochloride. In this case it is not necessary that the common salt, which is separated at the beginning of the process, is filtered off as it does not disturb the further operation, whilst the sodiumtoluenesulphonate frequently causes a disagreeable skimming of the boiling solution.

What we claim is:

1. A process for the preparation of emetine, consisting in methylating cephaeline with phenyltrimethylammoniumhydroxide.

2. A process for the preparation of emetine, consisting in methylating cephaeline with mixtures of substances forming phenyltrimethylammoniumhydroxide.

In witness whereof we have hereunto signed our names this 27th day of May 1927.

ERNST BURCKHARDT.
MAX STÄRKLE.